US008171084B2

(12) United States Patent
Walter et al.

(10) Patent No.: US 8,171,084 B2
(45) Date of Patent: May 1, 2012

(54) CUSTOM EMOTICONS

(75) Inventors: Bettina Walter, Kirkland, WA (US); Jens Martin von Seelen Thorsen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1541 days.

(21) Appl. No.: 10/760,975

(22) Filed: Jan. 20, 2004

(65) Prior Publication Data

US 2005/0156873 A1   Jul. 21, 2005

(51) Int. Cl.
*G06F 15/16* (2006.01)

(52) U.S. Cl. ........ 709/206; 709/204; 709/205; 709/207; 715/706

(58) Field of Classification Search .......... 709/204–207; 715/706, 763, 764; 345/1.1–111, 156–184, 345/418–475
See application file for complete search history.

(56) References Cited

U.S. PATENT DOCUMENTS

| | | | |
|---|---|---|---|
| 5,278,955 A | 1/1994 | Forte et al. | |
| 5,432,907 A | 7/1995 | Picazo, Jr. et al. | |
| 5,784,001 A | 7/1998 | Deluca et al. | |
| 5,802,282 A | 9/1998 | Hales, II et al. | |
| 5,805,804 A | 9/1998 | Laursen et al. | |
| 5,987,515 A | 11/1999 | Ratcliff et al. | |
| 6,003,088 A | 12/1999 | Houston et al. | |
| 6,252,588 B1 * | 6/2001 | Dawson | 715/752 |
| 6,292,880 B1 | 9/2001 | Mattis et al. | |
| 6,347,085 B2 | 2/2002 | Kelly | |
| 6,434,568 B1 | 8/2002 | Bowman-Arnuah | |
| 6,453,294 B1 | 9/2002 | Dutta et al. | |
| 6,463,078 B1 | 10/2002 | Engstrom et al. | |
| 6,490,615 B1 | 12/2002 | Dias et al. | |
| 6,535,867 B1 | 3/2003 | Waters | |
| 6,549,937 B1 | 4/2003 | Auerbach et al. | |
| 6,594,665 B1 | 7/2003 | Sowa et al. | |
| 6,610,104 B1 | 8/2003 | Lin et al. | |
| 6,629,793 B1 * | 10/2003 | Miller | 400/472 |
| 6,813,690 B1 | 11/2004 | Lango et al. | |
| 6,941,344 B2 | 9/2005 | Prell et al. | |
| 6,990,452 B1 * | 1/2006 | Ostermann et al. | 704/260 |
| 7,013,327 B1 * | 3/2006 | Hickman et al. | 709/208 |

(Continued)

FOREIGN PATENT DOCUMENTS

EP   0665670   8/1995

(Continued)

OTHER PUBLICATIONS

BigBlueBall Forums; Trillian Emoticons; Aug. 7, 2002; BigBlueBall.com.*

(Continued)

*Primary Examiner* — Brian P Whipple
(74) *Attorney, Agent, or Firm* — Lee & Hayes, PLLC

(57) ABSTRACT

Methods and devices for creating and transferring custom emoticons allow a user to adopt an arbitrary image as an emoticon, which can then be represented by a character sequence in real-time communication. In one implementation, custom emoticons can be included in a message and transmitted to a receiver in the message. In another implementation, character sequences representing the custom emoticons can be transmitted in the message instead of the custom emoticons in order to preserve performance of text messaging. At the receiving end, the character sequences are replaced by their corresponding custom emoticons, which can be retrieved locally if they have been previously received, or can be retrieved from the sender in a separate communication from the text message if they have not been previously received.

29 Claims, 9 Drawing Sheets

U.S. PATENT DOCUMENTS

| | | | |
|---|---|---|---|
| 7,031,956 B1 | 4/2006 | Lee et al. | |
| 7,080,139 B1* | 7/2006 | Briggs et al. | 709/224 |
| 7,171,415 B2 | 1/2007 | Kan et al. | |
| 7,203,356 B2 | 4/2007 | Gokturk et al. | |
| 7,233,979 B2 | 6/2007 | Dickerman et al. | |
| 7,302,270 B1 | 11/2007 | Day | |
| 7,353,253 B1* | 4/2008 | Zhao | 709/204 |
| 7,437,364 B1 | 10/2008 | Fredricksen et al. | |
| 7,437,374 B2 | 10/2008 | Chen et al. | |
| 7,543,030 B2 | 6/2009 | Hsieh et al. | |
| 7,870,196 B2 | 1/2011 | Costa Requena | |
| 2001/0003189 A1 | 6/2001 | Miyazawa et al. | |
| 2001/0025280 A1 | 9/2001 | Mandato et al. | |
| 2002/0010746 A1* | 1/2002 | Jilk et al. | 709/206 |
| 2002/0036990 A1* | 3/2002 | Chodor et al. | 370/262 |
| 2002/0065931 A1* | 5/2002 | Goodwin et al. | 709/232 |
| 2002/0077135 A1* | 6/2002 | Hyon | 455/466 |
| 2002/0107925 A1* | 8/2002 | Goldschneider et al. | 709/206 |
| 2002/0178230 A1 | 11/2002 | Aggarwal et al. | |
| 2002/0184309 A1* | 12/2002 | Danker et al. | 709/204 |
| 2002/0184311 A1 | 12/2002 | Traversat et al. | |
| 2002/0194006 A1* | 12/2002 | Challapali | 704/276 |
| 2003/0065721 A1* | 4/2003 | Roskind | 709/204 |
| 2003/0131098 A1* | 7/2003 | Huntington et al. | 709/224 |
| 2003/0177184 A1 | 9/2003 | Dickerman et al. | |
| 2003/0177485 A1 | 9/2003 | Waldin, Jr. et al. | |
| 2003/0208543 A1* | 11/2003 | Enete et al. | 709/206 |
| 2003/0217099 A1 | 11/2003 | Bobde et al. | |
| 2003/0217142 A1 | 11/2003 | Bobde et al. | |
| 2003/0222907 A1 | 12/2003 | Heikes et al. | |
| 2003/0225846 A1* | 12/2003 | Heikes et al. | 709/207 |
| 2003/0225847 A1* | 12/2003 | Heikes et al. | 709/207 |
| 2003/0225848 A1* | 12/2003 | Heikes et al. | 709/207 |
| 2004/0015569 A1 | 1/2004 | Lonnfors et al. | |
| 2004/0018858 A1* | 1/2004 | Nelson | 455/566 |
| 2004/0064512 A1 | 4/2004 | Arora et al. | |
| 2004/0070567 A1* | 4/2004 | Longe et al. | 345/156 |
| 2004/0098502 A1 | 5/2004 | Xu et al. | |
| 2004/0153517 A1* | 8/2004 | Gang et al. | 709/206 |
| 2004/0162877 A1* | 8/2004 | Van Dok et al. | 709/204 |
| 2004/0179712 A1* | 9/2004 | Roelofsen et al. | 382/100 |
| 2004/0268236 A1 | 12/2004 | Chidlovskii et al. | |
| 2005/0004993 A1* | 1/2005 | Miller et al. | 709/207 |
| 2005/0027839 A1* | 2/2005 | Day et al. | 709/223 |
| 2005/0039116 A1 | 2/2005 | Slack-Smith | |
| 2005/0091261 A1 | 4/2005 | Wu et al. | |
| 2005/0273472 A1 | 12/2005 | Reddy et al. | |
| 2006/0015560 A1 | 1/2006 | MacAuley et al. | |
| 2006/0019636 A1* | 1/2006 | Guglielmi et al. | 455/412.1 |
| 2006/0020708 A1 | 1/2006 | Hsieh et al. | |
| 2006/0048130 A1 | 3/2006 | Napier et al. | |
| 2010/0177048 A1* | 7/2010 | Semenets et al. | 345/173 |

FOREIGN PATENT DOCUMENTS

| | | |
|---|---|---|
| JP | 4084248 A | 3/1992 |
| JP | 7311704 A | 11/1995 |
| JP | 2001109696 A | 4/2001 |
| JP | 2001211200 A | 8/2001 |
| JP | 2001308935 A | 11/2001 |
| JP | 2002543676 | 12/2002 |
| JP | 2003167832 A | 6/2003 |
| JP | 2003535524 T | 11/2003 |
| JP | 2004532478 | 10/2004 |
| JP | 2005027172 | 1/2005 |
| JP | 2006512640 | 4/2006 |
| WO | WO 01/71992 | 9/2001 |
| WO | WO 01/93503 | 12/2001 |
| WO | WO0203217 A1 | 1/2002 |
| WO | WO03034196 A1 | 4/2003 |
| WO | 03046726 A1 | 6/2003 |
| WO | WO2004004139 | 1/2004 |
| WO | WO2004059946 | 7/2004 |
| WO | WO2005017660 | 2/2005 |

OTHER PUBLICATIONS

Dave Copeland; E-mail's signature smiley face is long in the tooth; Sep. 20, 2002; Pittsburgh Tribune-Review.*

Ultimate Metal Forum; Smiley Emoticons; Sep. 5, 2002; UltimateMetal.com.*

Aaron of Borg; Yahoo Messenger 5.5 hidden smileys; Oct. 10, 2002; The Easter Egg Archive.*

Sector #101; Yahoo Messenger Emoticons; Aug. 28, 2002; Sector #101.*

AllAlias.com; Must Read: Signature/Avatar Rules, Updated May 23, 2003; Sep. 6, 2003; AllAlias.com.*

Irene Albrecht et al., "May I talk to you? :-) "—Facial Animation from Text, 2002, IEEE Computer Society.*

Anne Fitzpatrick, On the origins of :-), 2003, IEEE Computer Society.*

U.S. Appl. No. 10/611,575, Holmes et al., filed Jul. 1, 2003, entitled, "Transport System for Instant Messaging".

U.S. Appl. No. 10/611,599, Miller et al., filed Jul. 1, 2003, entitled, "Instant Messaging Object Store".

"GeRM: Generic RTP Multiplexing", Handley, M., Internet Engineering Task Force, XP-002139359, Nov. 11,1998, 7 pages.

"Instant Message Sessions in SIMPLE", Campbell et al., SIMPLE Working Group, Jun. 30, 2003, pp. 1-58.

U.S. Appl. No. 10/987,396; Zlateff, et al.; filed Nov. 12, 2004.

U.S. Appl. No. 11/111,532; Zlateff, et al.; filed Apr. 21, 2005.

"New Tunneling Techniques", Cisco Systems, available online at www.cisco.com, accessed Jun. 6, 2003.

Rosenberg, et al., "STUN Simple Traversal of User Datagram Protocol (UDP) Through Network Address Translators (NATs)", Request for Comments: 3489, Netwrk Working Group, Mar. 2003, pp. 1 through 32, the Internet Society.

European Search Report in EP Application No. 04102579.2, Jan. 20, 2005, 2 pages.

Borger, et al, "IP over SCI", IEEE, 2000, pp. 73-77.

Kant et al., "A Framework for Classifying Peer-to-Peer Technologies", Cluster Computing and the Grid, 2002, 2nd IEEE/ACM International Symposium on Publication Year: 2002, 8 pages.

Lonnfors et al., "Presence Information Data format (PIDF) Extension for Partial Presence", Apr. 20, 2004, IETF Draft, pp. 1-15.

Sugano et al., "Presence Information Data Format", Aug. 2004, IETF; RFC 3863; pp. 1-26.

Day, et al., "A Model for Presence and Instant Messaging", The Internet Society, Feb. 2000, 18 pgs.

Day, et al., "Instant Messaging / Presence Protocol Requirements", The Internet Society, Feb. 2000, 27 pgs.

Translated Japanes Office Action mailed Apr. 26, 2011 for Japanese Patent Application No. 2006-052066, a counterpart foreign application of U.S. Appl. No. 11/068,731.

Office Action for U.S. Appl. No. 12/106,900, mailed on Apr. 29, 2011, John S. Holmes, "Transport System for Instant Messaging".

Schulzrinne et al., "The Session Initiation Protocol: Internet-Centric Signaling", IEEE Communication Magazine, Oct. 2000, pp. 134-141.

Office Action for U.S. Appl. No. 11/068,731, mailed on Oct. 18, 2011, Carmen Zlateff, "Client-Side Presence Documentation", 30 pgs.

Canadian Office Action mailed Aug. 9, 2011 for Canadian patent application No. 2470013, a counterpart foreign application of US patent No. 7,363,378, 3 pages.

Korean Office Action mailed Sep. 20, 2011 for Korean patent application No. 10-2004-51224, a counterpart foreign application of US patent No. 7,363,378, 3 pages.

AOL Instant Messenger homepage, provided by America Online of Dulles, VA, available at [[http://www.aim.com/]], accessed on Nov. 8, 2005, 1 page.

MSN Messenger homepage, provided by Microsoft Corporation of Redmond, WA, available at [[http://messenger.msn.com/Xp/Default.aspx]], accessed on Nov. 8, 2005, 2 pages.

Yahoo! Messenger homepage, provided by Yahoo! of Sunnyvale, CA, available at [[ http://messenger.yahoo.com/?ovchn=GGL&ovcpn=US_Can_Branded-Generic&ovcrn=yahoo+messenger&ovtac=PPC]], accessed on Nov. 8, 2005, 2 pages.

* cited by examiner

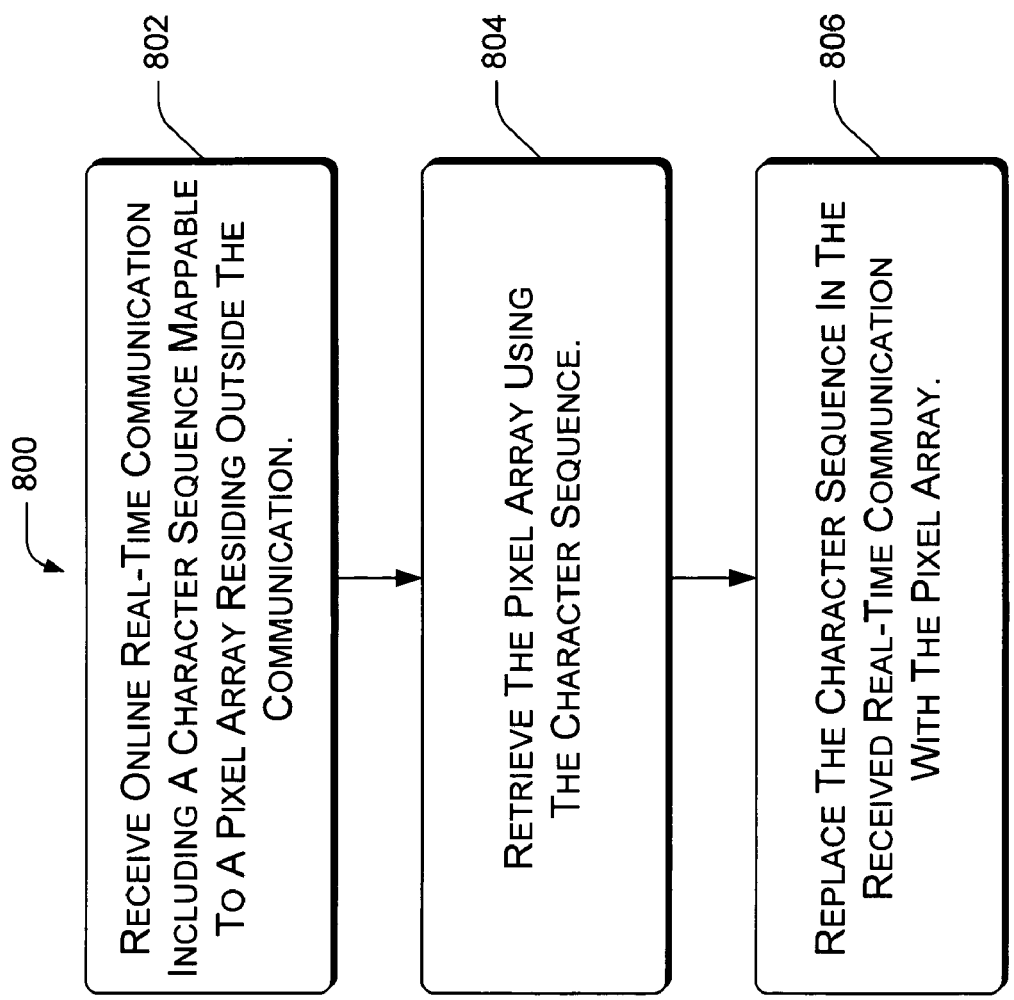

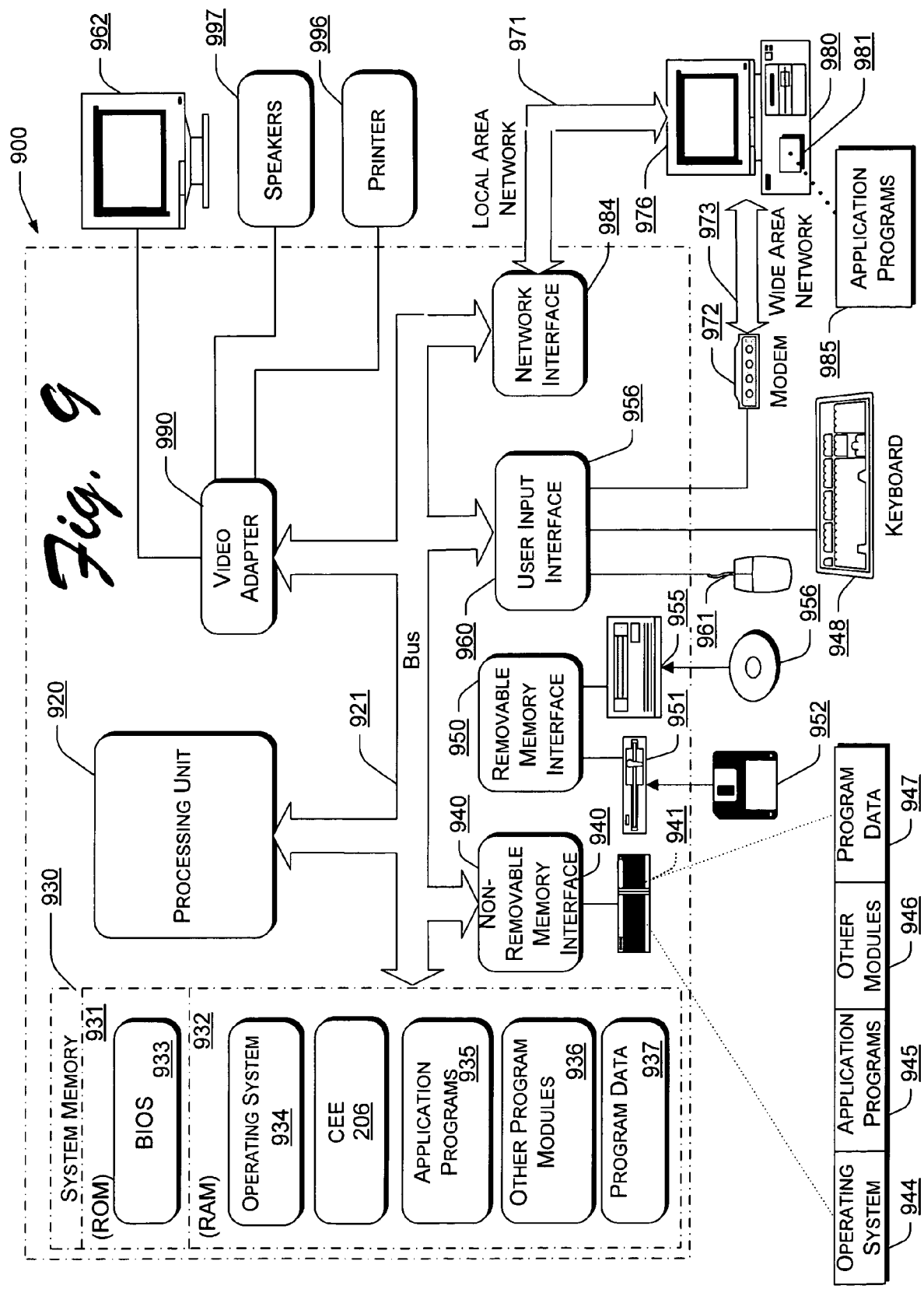

CUSTOM EMOTICONS

TECHNICAL FIELD

The subject matter relates generally to instant messaging and more specifically to custom emoticons.

BACKGROUND

Emoticons have acquired immense popularity and hence importance in new email, chatroom, instant messaging, and even operating system applications. The variety of available emoticons has increased tremendously, from a few types of "happy faces" to a multitude of elaborate and colorful animations. In many cases, an increase in the number of available emoticons has been a selling feature for new releases of communications products. However, there are now so many emoticons available that some applications may be reaching a limit on the number of pre-established ("pre-packaged") emoticons that can be included with or managed by an application. There is an exhaustion point for trying to provide a pre-packaged emoticon for every human emotion. Still, users clamor for more emoticons, and especially for more nuanced emoticons that capture the subtleties of human emotions and situations.

FIG. 1 shows a conventional list of pre-packaged emoticons 100 in a dialogue box of an application. Typically a user selects one of the emoticons to insert within a textual dialogue or email by double clicking a mouse on an icon 102 of the emoticon, or by clicking on the icon 102 and then actuating a select button 104.

With the increase in the number and "sophistication" of emoticons, some problems are inevitable. Many chatroom and instant messaging products, in which emoticons find perfect application in describing the users' real-time emotions, rely on limited bandwidth or the transmission of short communications ("messages") that contain relatively little data. In other words, many chatroom and instant messaging applications achieve their agility and speed by streamlining data bulk into "lean" messages that typically have a limited data size, such as 1-2 kilobytes or approximately 400 alphanumeric characters plus headers. Adding one or more complex emoticons—a graphic that may require an inordinate amount of data space compared with text—to one of these lean messages can be detrimental to the performance of the chatroom or instant messaging application. Still, an emoticon picture is often worth a thousand words of text, so techniques are needed for producing an even greater variety of emoticons and for being able to send them without increasing the data size of lean messages.

SUMMARY

Methods and devices for creating and transferring custom emoticons allow a user to adopt an arbitrary image as an emoticon, which can then be represented by a character sequence in real-time communication. In one implementation, custom emoticons can be included in a message and transmitted to a receiver in the message. In another implementation, character sequences representing the custom emoticons can be transmitted in the message instead of the custom emoticons in order to preserve performance of text messaging. At the receiving end, the character sequences are replaced by their corresponding custom emoticons, which can be retrieved locally if they have been previously received, or can be retrieved from the sender in a separate communication from the text message if they have not been previously received.

BRIEF DESCRIPTION OF THE DRAWINGS

FIG. 8 is a flow diagram of an exemplary method of receiving a real-time communication that includes custom emoticons.

FIG. 9 is a block diagram of an exemplary computing device environment for practicing the subject matter.

DETAILED DESCRIPTION

Overview

Figure 1:
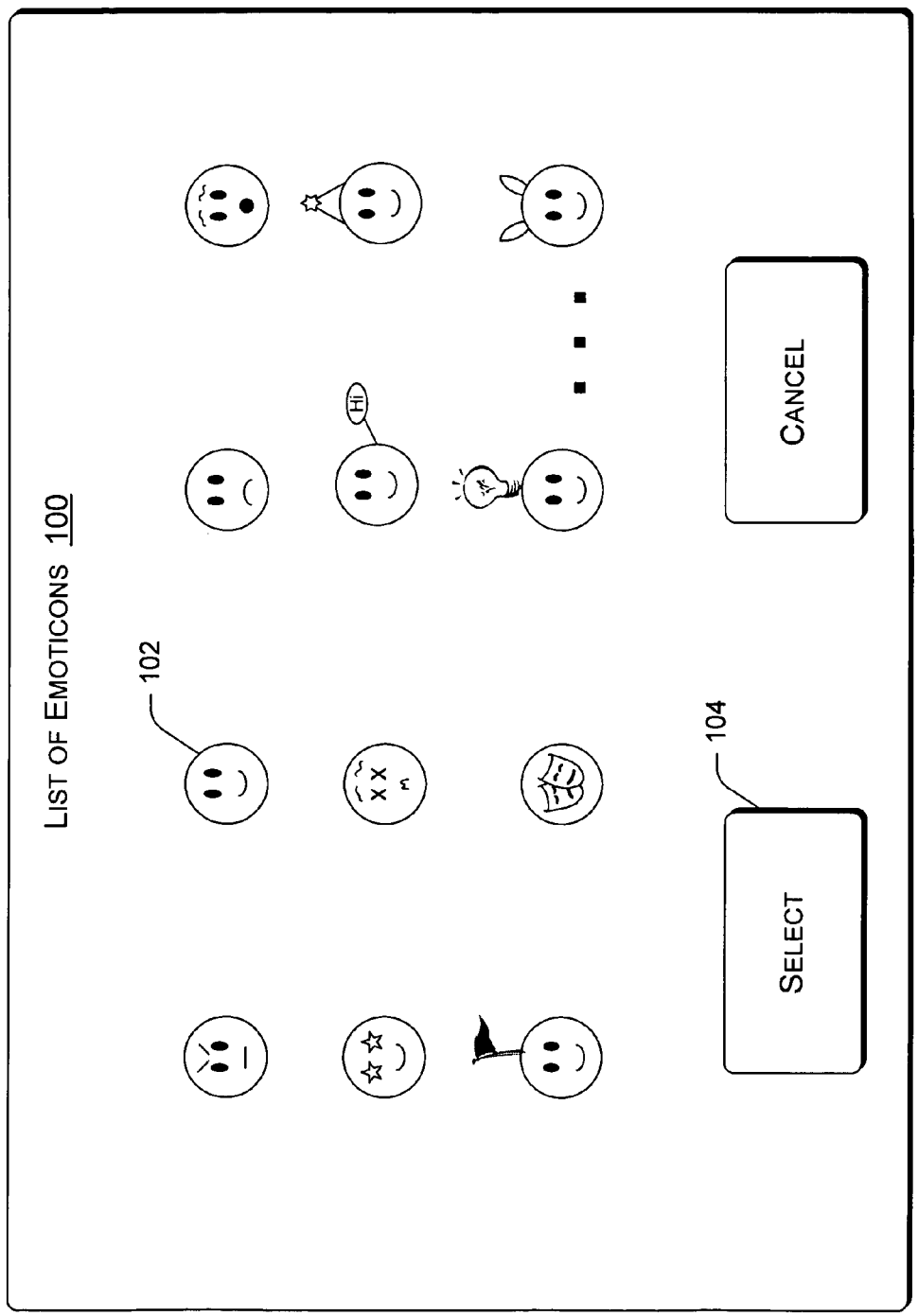
FIG. 1 is a graphic representation of conventional pre-packaged emoticons available in an application.

The subject matter described herein includes methods and devices for creating custom emoticons from images not previously associated with emoticons. Further, when custom emoticons are added to a text message, some implementations of the subject matter transmit the custom emoticons to a receiver of the message without degrading the textual performance of instant messaging applications, chatroom exchanges, and toasts-the notifications that appear when buddies log on.

Keyboard keystrokes or textual alphanumeric "character sequences" are assigned as placeholders for custom emoticons within a real-time message. A custom emoticon or its associated placeholder character sequence can be entered in an appropriate location of a real-time message during composition of the message. Custom emoticons present in the message are typically converted to their corresponding character sequences before transmitting the message in order to preserve the performance of text messaging. The character sequences map to their associated custom emoticons. Upon receiving a real-time message that includes an assigned character sequence, the character sequence can be mapped back to a corresponding custom emoticon, which can then be displayed in the received message in place of the character sequence. Thus, custom emoticons do not necessarily have to be sent within the text message itself. This allows text messaging to remain lean and fast, while the subject matter provides ways for reconstructing custom emoticons into the message at the receiving end.

Instead of selecting from a necessarily limited host of pre-packaged emoticons, users can create their own emoticons by adapting many sorts of image files to be custom emoticons. In one implementation, image files of various types and sizes are each standardized into a pixel array of uniform dimensions to be used as emoticons.

Many real-time messaging applications aim to minimize data for transmission. An instant message or chatroom communique that contains very streamlined data is referred to herein as a "lean" message. To include one or more custom emoticons in a lean message would degrade the performance of many instant messaging or chatroom applications. Thus, the subject matter also includes exemplary techniques for sending a lean message to a receiver wherein one or more custom emoticons appear in the lean message at the receiver's end.

"Real-time" as used herein means that participants can converse back and forth via text, image, or sound without unreasonable delay while they are online. Thus, real-time technically means "near real-time" as there is always some degree of hysteresis or delay in online communication.

Reference in this specification to "one implementation" or "an implementation" means that a particular feature, structure, or characteristic described in connection with the implementation is included in at least one implementation of the subject matter. The appearances of the phrase "in one implementation" in various places in the specification are not necessarily all referring to the same implementation.

Exemplary System

Figure 2:
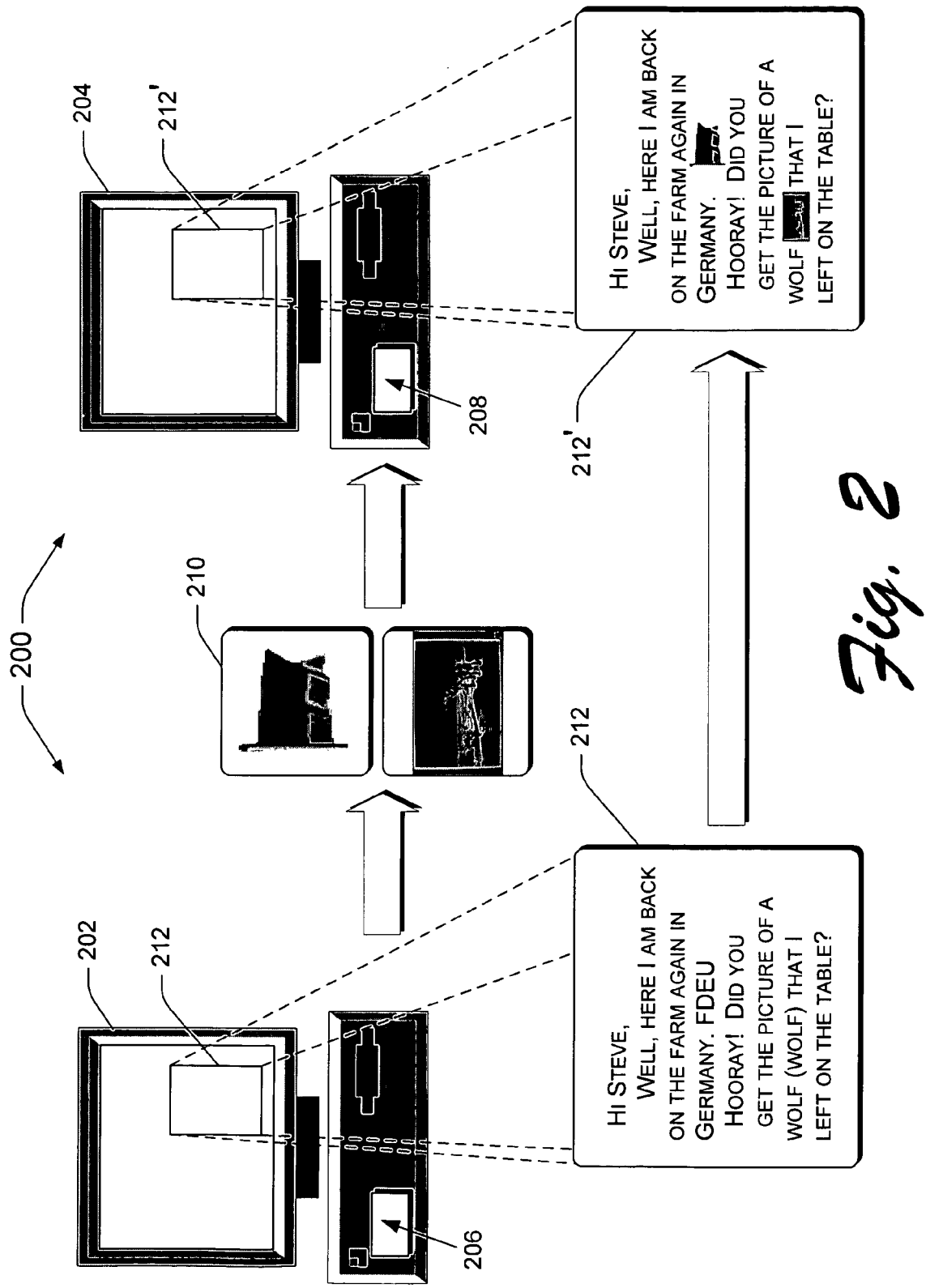
FIG. 2 is a graphic representation of exemplary custom emoticons displayed in a text message but not transferred with the text message.

FIG. 2 shows an exemplary system 200 for creating and transferring custom emoticons. Multiple network nodes (e.g., 202, 204) are communicatively coupled so that users may communicate using instant messaging, a chatroom application, email, etc. In one implementation, each node 202, 204 includes an exemplary custom emoticon engine "CEE" (e.g., 206, 208). An exemplary CEE 206 allows a user to adopt an arbitrary image 210 as a custom emoticon. An exemplary CEE 206 also performs real-time mapping from the text of a typed message to custom emoticons to be included, inserted, substituted, etc., into the message, without including the custom emoticons in the transmission of the text message itself.

A user can create a custom emoticon by downloading and/or editing an image, or by using a photography or drawing application to create an image for the custom emoticon from scratch. Once a user has adopted an arbitrary image 210 to be a custom emoticon, an exemplary CEE 206 allows the user to send a text message 212 that contains only text and yet have one or more custom emoticons 210 appear at appropriate places in the display of the text message 212'.

Exemplary Engine

Figure 3:
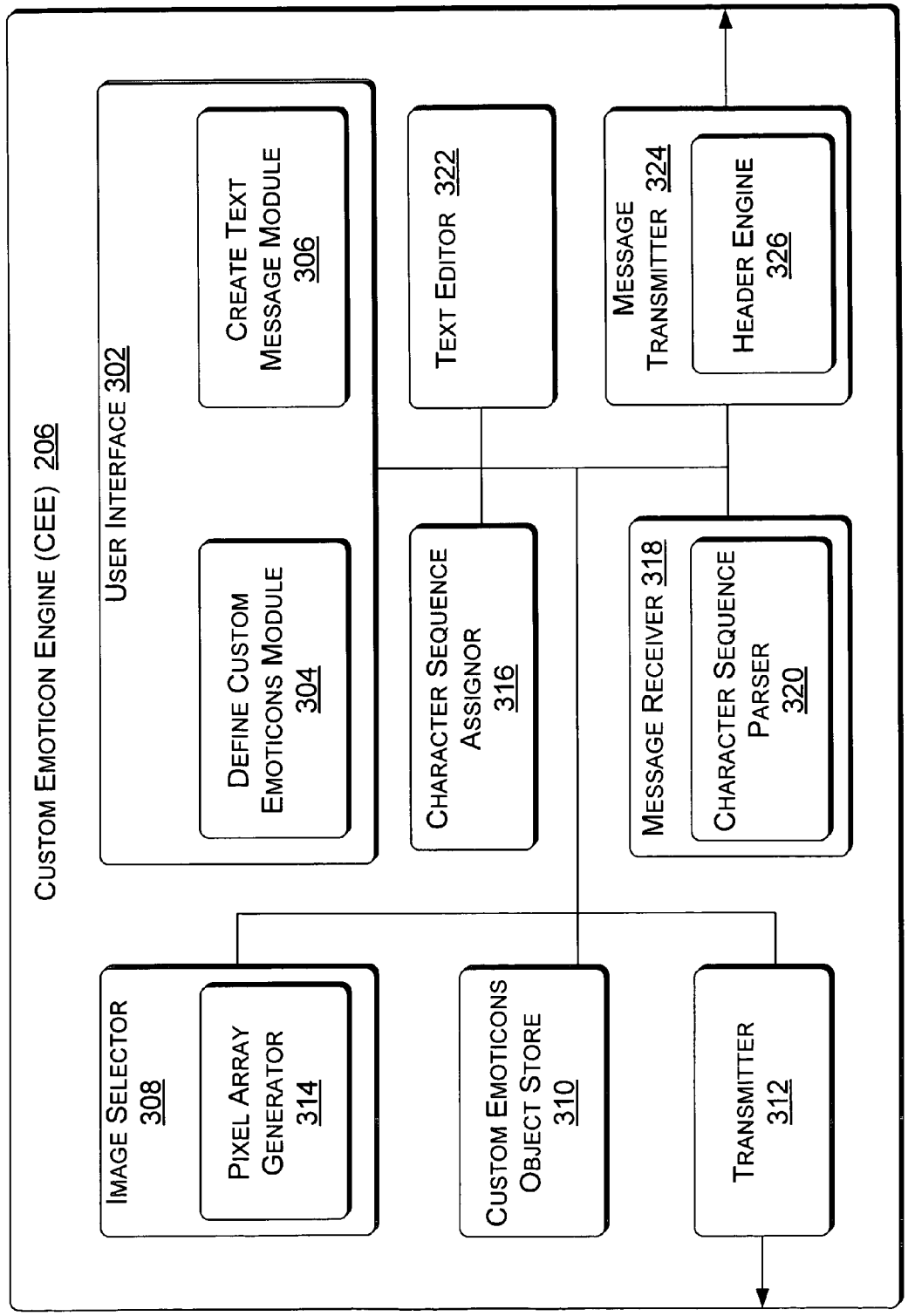
FIG. 3 is a block diagram of an exemplary custom emoticon engine.

FIG. 3 shows an exemplary custom emoticon engine, CEE 206, in greater detail than in FIG. 2. An exemplary CEE 206 typically resides on clients 202, 204, that is, on a message sender's computing device 202 and a message receiver's computing device 204. Of course the sending and receiving roles change frequently during real-time communication between two or more users. Thus, an exemplary CEE 206 has components for sending text messages and custom emoticons and components for receiving text messages and custom emoticons. An exemplary computing device environment suitable for an exemplary CEE 206 and suitable for practicing exemplary methods described herein is described with respect to FIG. 9.

An exemplary CEE 206 includes a user interface 302 that may include a "define custom emoticons" module 304 and a "create text message" module 306. The exemplary CEE 206 also includes an image selector 308, a custom emoticons object store 310, and a transmitter 312, all communicatively coupled as illustrated. The image selector 308 may also include a pixel array generator 314. Further, an exemplary CEE 206 may include a character sequence assignor 316 and a message receiver 318 that includes a character sequence parser 320. Finally, an exemplary CEE 206 may include a text editor 322, either discretely as illustrated or integrated with the user interface 302, and a message transmitter 324 that may include a header engine 326. Control logic (not shown) may direct operation of the various components listed above and associations between the components.

As controlled by an automatic process or by a user through a "define custom emoticons" dialogue generated by a module (304) of the user interface 302, an image selector 308 captures an image and converts the image to an emoticon. In one implementation, images of various sizes and formats, such as the joint photographic experts group (JPEG) format, the tagged image file format (TIFF) format, the graphics interchange format (GIF) format, the bitmap (BMP) format, the portable network graphics (PNG) format, etc., can be selected and converted into custom emoticons by a pixel array generator 314, which converts each image into a pixel array of pre-determined dimensions, such as 19×19 pixels. An image may be normalized in other ways to fit a pre-determined pixel array grid. For example, if the pre-determined pixel array for making a custom emoticon is a 19×19 pixel grid, then the aspect ratio of an image that does not fill the grid can be maintained by adding background filler to the sides of the image to make up the 19×19 pixel grid.

In one implementation, an exemplary CEE 206 also includes advanced image editing features to change visual characteristics of an adopted image so that the image is more suitable for use as a custom emoticon. For example, an advanced image editor may allow a user to select the lightness and darkness, contrast, sharpness, color, etc. of an image. These utilities may be especially useful when reducing the size of a large image into a pixel array dimensioned for a modestly sized custom emoticon.

Each new custom emoticon can be saved in a custom emoticons object store 310 together with associated information, such as a character sequence for mapping from a text message to the emoticon and optionally, a nickname. In one implementation, a nickname serves as the mapping character sequence, so that a custom emoticon is substituted for the nickname each time the nickname appears in a received text message. In other implementations, a unique character sequence assigned to a custom emoticon maps to the custom emoticon and a nickname is associated with the custom emoticon as well, so that the nickname or common name may be used in a text message without calling for insertion of a custom emoticon.

The character sequence assignor 316 may utilize a "define custom emoticons" dialogue (304) or an automatic process to associate a unique "character sequence" with each custom emoticon. A character sequence usually consists of alphanumeric characters (or other characters or codes that can be represented in a text message) that can be typed or inserted by the same text editor 322 that is creating a text message. Although keystrokes imply a keyboard, other conventional means of creating a text message can also be used to form a character sequence of characters or codes to map to a custom emoticon.

In one implementation, character sequences are limited to a short sequence of characters, such as seven. The character sequence "dog" can result in a custom emoticon of a dog appearing each time "dog" is used in a message, so other characters may be added to common names to set mappable character sequences apart from text that does not map to a custom emoticon. Hence a character sequence may use brackets, such as [dog] or an introductory character, such as @dog.

When a character sequence has been assigned to a custom emoticon by a character sequence assignor 316, the custom emoticon or its assigned character sequence may by used in an online real-time message. If the custom emoticon itself is embedded in a text message during composition of the message, then the custom emoticon is typically converted to its assigned character sequence before transmission to a message receiver. In some implementations, this allows an exemplary CEE 206 to maintain the speed and other performance characteristics of text messaging if custom emoticons occupy enough data space to degrade performance when transmitted along with a corresponding text message. Thus, a message transmitter 324 may be employed to send the character sequence to a destination, i.e., within a communication such as an instant message. Each time the character sequence associated with a custom emoticon is used in a text message, a custom emoticon associated with the character sequence will be substituted for the character sequence at the destination, e.g., the receiving client 204.

When a user creates a text message, for example using a "create text message" dialogue (306) associated with a user interface 302 and/or a text editor 322, the text message may contain one or more of the character sequences that map to custom emoticons. In one implementation, a message transmitter 324 or other component of an exemplary CEE 206 may pass the text message to a character sequence parser 320 to find character sequences within the text message that map to custom emoticons. The character sequences may be used in various ways, depending on the implementation.

In one implementation, a character sequence assigned to a custom emoticon may be made mappable to the custom emoticon by parsing the character sequence into an object name that includes both a location of the associated custom emoticon and a hash and/or a globally unique identifier (GUID). The location can be used by a message recipient to retrieve the associated custom emoticon from the sender and the hash and/or GUID can be used both on sending and receiving ends for local storage. Retrieval of custom emoticons pointed to by associated character sequences in a real-time message will be discussed in greater detail in relation to FIG. 4. It should be noted that "retrieving" a custom emoticon, pixels representing a custom emoticon, or data representing the pixels includes a sender, a remote store, or a local store "transmitting" the custom emoticon, the pixels, or the data to the client or process performing the retrieving.

In another implementation, the custom character sequences themselves may be placed in a header of an outgoing text message by a header engine 326, to be read by a receiving client 204 in order to request custom emoticons from the sending client 202. In yet another implementation, instead of or in addition to placing the custom emoticon information in a header of the outgoing text message, the character sequence parser 320 may inform the custom emoticons object store 310 to immediately begin sending the custom emoticons corresponding to the exemplary character sequences found in the text message to the recipient by another communications pathway. In all three of the implementations just described, however, the text message is sent by a message transmitter 324 using one modality of transmission, such as an instant messaging application, and the custom emoticons are sent by a separate modality, such as a transmitter 312 using an object store and/or an object transport mechanism, in order to spare an increase in the data size of the text messages sent by the message transmitter 324.

It should be noted that an exemplary CEE 206 can be implemented in software, firmware, hardware, or a combination of software, firmware, hardware, etc. The illustrated exemplary CEE 206 is only one example of software, firmware, and/or hardware that can perform the subject matter.

Figure 4:
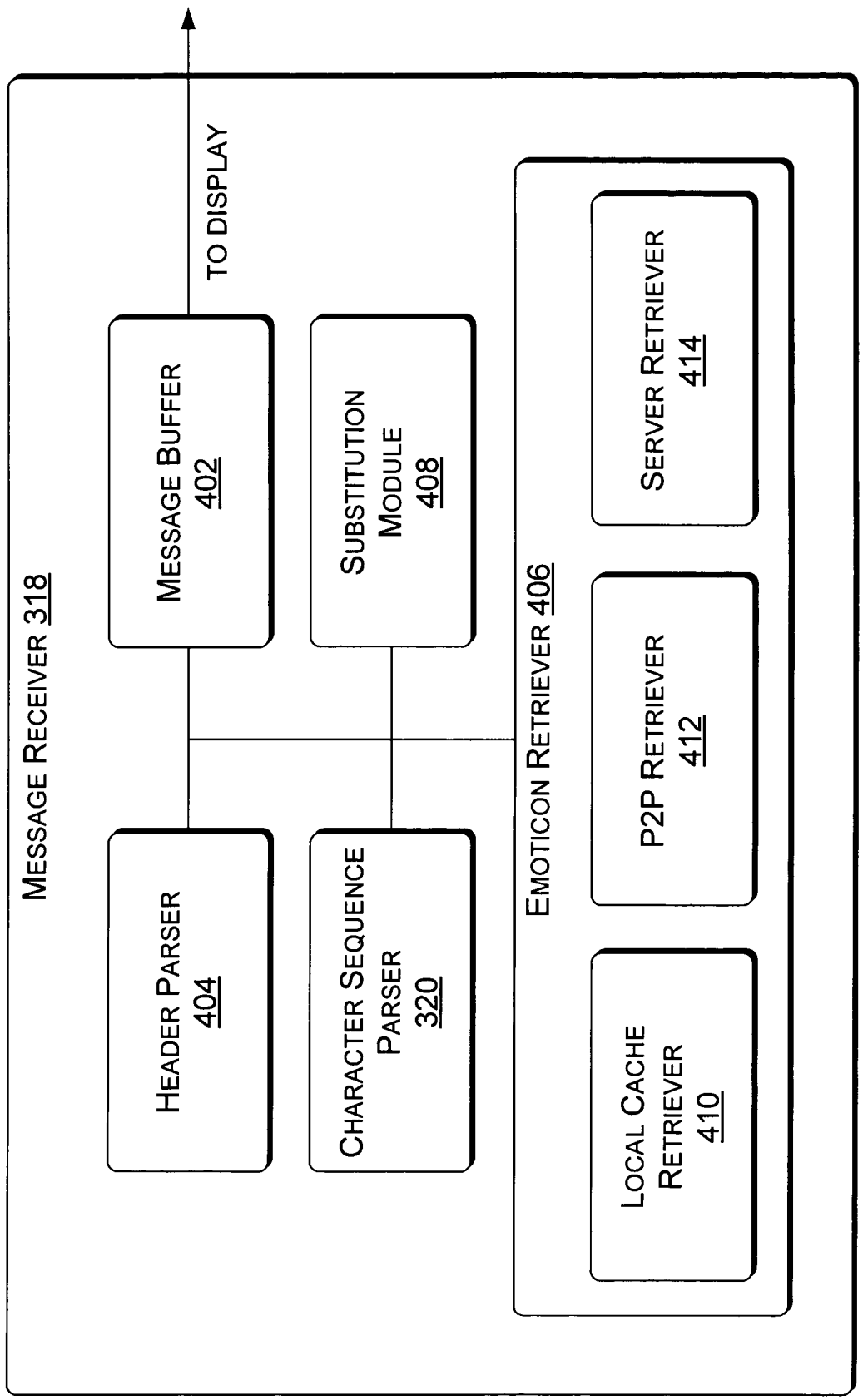
FIG. 4 is a block diagram of a message receiver module of an exemplary custom emoticon engine.

FIG. 4 shows the message receiver 318 of FIG. 3 in greater detail. A message receiver 318 may include a message buffer 402, header parser 404, character sequence parser 320, emoticon retriever 406, and substitution module 408, communicatively coupled as illustrated. The emoticon retriever 406 may further include a local cache retriever 410, a point-to-point retriever 412, and a server retriever 414.

In one implementation, when a user receives a communication, such as a chatroom communication or an instant message, the message buffer 402 holds the message for display. In one implementation, the message is displayed immediately whether custom emoticons are available to be posted within the message or not. If they are not ready, then the original character sequences that map to the custom emoticons may be displayed, or a blank image may be displayed into which a custom emoticon is inserted when it has been retrieved. In another implementation, a message is not displayed at all until relevant custom emoticons are ready to be substituted into the message, but since the time interval for retrieving custom emoticons is usually unnoticeable, this "delay" in "real-time" communication may also be unnoticeable.

In some implementations, a received message may have one or more headers to be parsed by the header parser 404 that indicate the presence of one or more custom emoticons in a message. A header can also indicate a location for retrieving custom emoticons, and in some implementation, can even indicate the position of custom emoticons to be inserted within the received message.

In one implementation, the message receiver 318 uses an object name provided by the header parser 404 for each custom emoticon to be retrieved and then inserted in a received message. That is, a character sequence parser 320 on the sender's computing device may have already parsed a mappable character sequence (representing a custom emoticon data object) into an object name, including a location identifier and a hash value, and placed the object name in a header of the message sent to the receiving client 204. The object name allows retrieval of the custom emoticon from a location specified by the location identifier for storage in a local cache using the hash value as a storage address. An implementation of the message receiver 318 (and an exemplary CEE 206) may use object store and object transport mechanisms and technologies as described in U.S. patent application Ser. No. 10/611,599 by Miller et al., entitled "Instant Messaging Object Store" and U.S. patent application Ser. No. 10/611,575 by Miller et al., entitled "Transport System for Instant Messaging," which are incorporated herein by reference for all they disclose and teach.

In other implementations, instead of or in addition to using the object store and transport technologies mentioned above, the message receiver 318 uses a character sequence parser 320 of an exemplary CEE 206 on the receiving client's computing device to obtain character sequences from the message in order to map to custom emoticons. In some implementations, the mappable character sequences may be collected in a header of the message, but in still other implementations the character sequence parser 320 performs in-string functions or otherwise searches the message for mappable character sequences.

An emoticon retriever 406 receives an emoticon identifier, such as an object name, from a header parser 404 or a mappable character sequence from either the character sequence parser 320 or the header parser 404, and uses the object name or the character sequence to map to and retrieve a custom emoticon. In one implementation, the custom emoticon is transferred as a PNG file. In one implementation, the emoticon retriever 406 first activates a local cache retriever 410, for example using the above-mentioned hash component of an object name. The custom emoticon being retrieved may have previously been retrieved from the message sender and may now reside in a local cache, such as a temporary Internet files cache used by a web browser. If the custom emoticon resides locally, the custom emoticon can be immediately loaded and/or retrieved as an image file. In one implementation a local cache retriever 410 of an exemplary CEE 206 uses a globally unique identifier (GUID) when checking to see if the relevant image file resides on a local computing device in a cache. If not, the emoticon retriever 406 parses an object name or a character sequence to determine an IP address of the originating computing device.

If the custom emoticon cannot be found in a local cache, then a point-to-point (P2P) retriever 412 may try to establish a P2P connection with the message sender. A P2P connection allows quick transfer of relatively large amounts of data, so this type of connection is preferred by an emoticon retriever 406 when a custom emoticon does not reside locally. The P2P retriever 412 tries to establish a direct connection by transmission control protocol (TCP) or user datagram protocol (UDP) between the receiver's computing device and the sender's computing device. If the connection is successful, then a port is opened and the custom emoticon is retrieved across the wire. A custom emoticon file may then be saved locally and then loaded repeatedly.

However, if a P2P connection cannot be established because of a firewall or a network address translation (NAT) table, then a server retriever 414 may establish a default connection through a server connection, since both the sender and receiver are connected to at least a server that administers the real-time communication session, e.g., a server in the Internet "cloud" that allows back and forth messaging. This latter type of connection, however, may be slower than a P2P connection. A typical server pipe is limited in the number of messages it can send per minute, and the data size of the messages. Thus the server retriever 414 may transfer custom emoticon data in smaller pieces, because of limitations placed on the pipe by the server. Custom emoticons received in pieces from the sender's custom emoticons object store 310 via a server are assembled at the receiver'end and can be loaded as a file by the message receiver 318.

Once the message receiver 318 is in possession of a custom emoticon associated with a character sequence, a substitution module 408 replaces the character sequences (e.g., textual) in the message with their corresponding custom emoticons.

It should be noted that the illustrated message receiver 318 of FIG. 4 can be implemented in software, firmware, hardware or a combination of software, firmware, hardware, etc. The illustrated exemplary message receiver 318 is only one example of software, firmware, and/or hardware that can perform the subject matter.

Exemplary User Interface Elements

Figure 5:
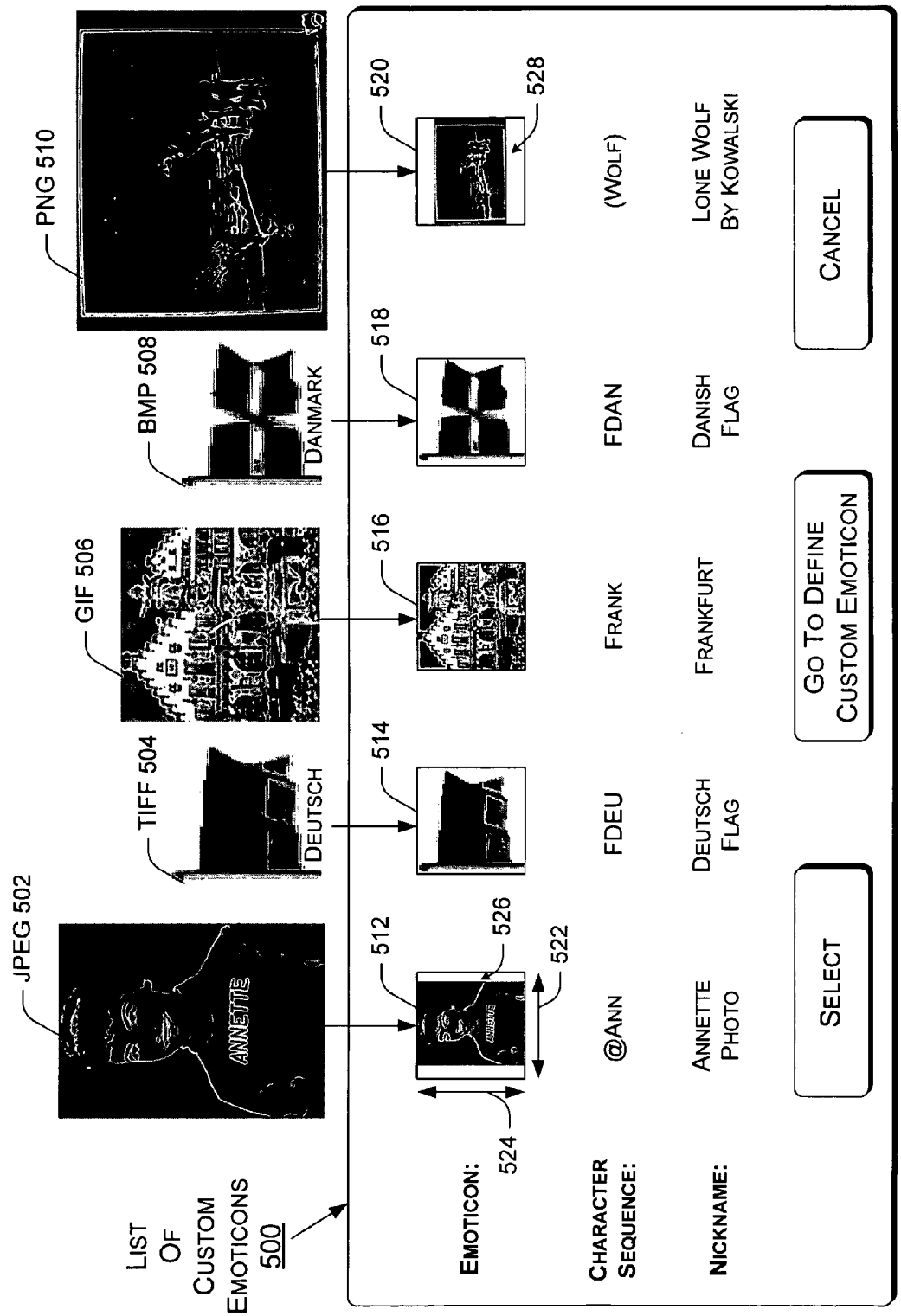
FIG. 5 is a graphic representation of an exemplary list of custom emoticons.

FIG. 5 shows a list of custom emoticons 500. In some implementations the list of custom emoticons 500 can be part of a dialogue box for selecting one or more of the custom emoticons for editing or for insertion into a text message—in which case a selected custom emoticon from the list 500 or a corresponding assigned character sequence that maps to the custom emoticon is inserted in an appropriate location in the text message.

In one implementation, elements of a list of custom emoticons 500 can be shown in a tooltip that appears on a display when the user hovers a pointing device over a user interface element. For example, a tooltip can appear to remind the user of available custom emoticons and/or corresponding character sequences. In the same or another implementation, a tooltip appears when the user points to a particular custom emoticon in order to remind of the character sequence and nickname assigned to that custom emoticon. In the same or yet another implementation, a list of custom emoticons 500 appears as a pop-down or unfolding menu that includes a dynamic list of a limited number of the custom emoticons created in a system and/or their corresponding character sequences. For example, the menu may dynamically show ten custom emoticons and when a new custom emoticon is added to the system, a preexisting custom emoticon drops from the list (but is not necessarily deleted from the custom emoticons object store 310).

With respect to one feature of the subject matter, many types and sizes of images can be converted for use as a custom emoticon. An image selector 308 of an exemplary CEE 206 may load an image file, such as a JPEG file 502, a TIFF file 504, a GIF file 506, a BMP file 508, a PNG file 510, etc., and convert the image to a custom emoticon (e.g., 512, 514, 516, 518, 520). In one implementation, the conversion is accomplished by representing each image as a pixel array of predetermined size: "x" pixels 522 by "y" pixels 524, e.g., 19×19 pixels. The image may be padded (e.g., 526 and 528) out to the size of the predetermined pixel array to maintain an image aspect ratio. Each new custom emoticon can be saved in a custom emoticons object store 310 together with its associated information, i.e., a mappable character sequence and a nickname.

Figure 6:
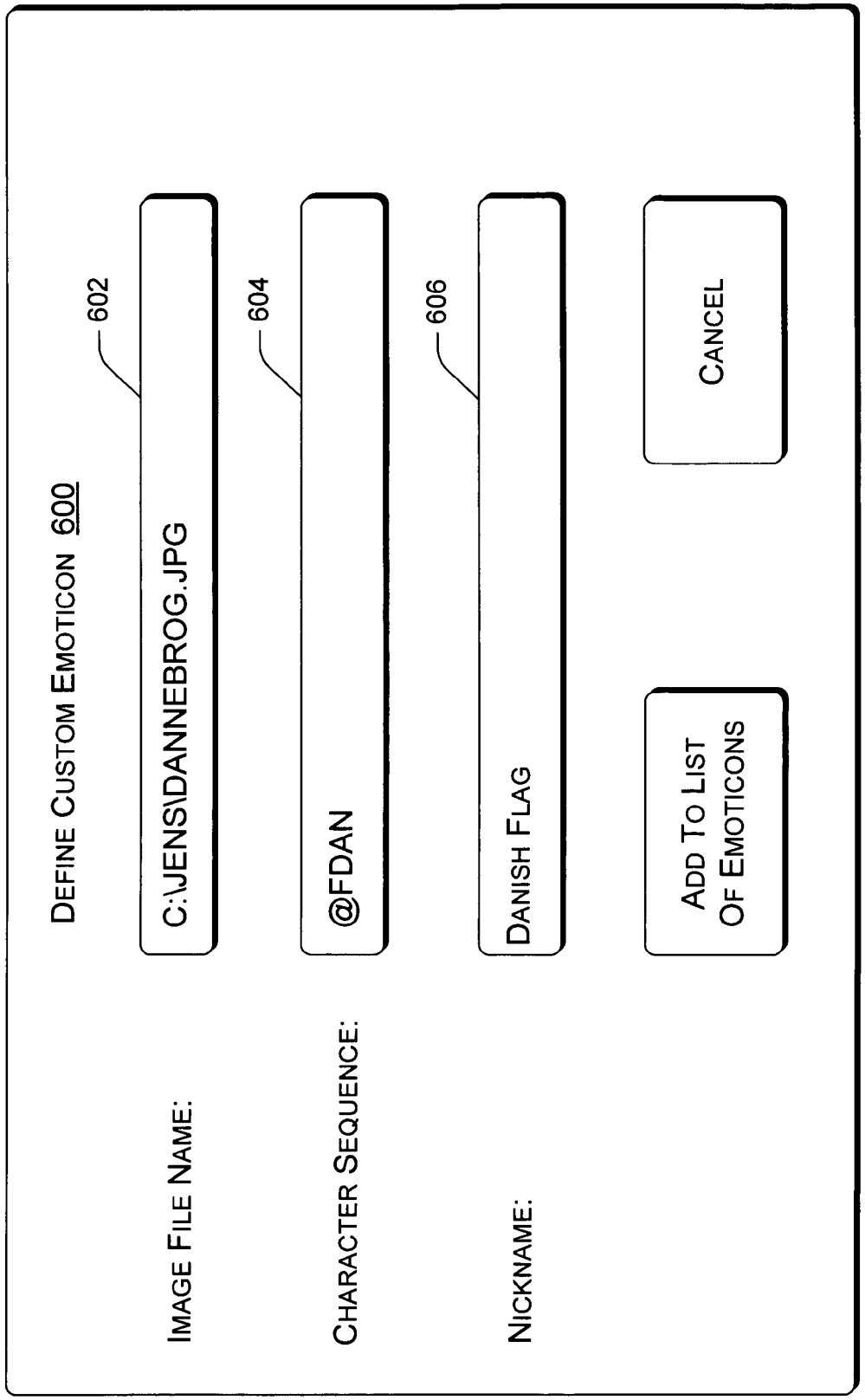
FIG. 6 is a graphic representation of an exemplary dialogue box for defining custom emoticons.

FIG. 6 shows a "define custom emoticons" dialogue 600 generated, for example, by a "define custom emoticons" module 304 of a user interface 302. The dialogue 600 may include an image filename entry field 602, a character sequence assignment entry field 604 and a nickname entry field 606. The information collected in the dialogue 600 is associated with a custom emoticon, e.g., from an image selector 308 and/or a pixel array generator 314, and sent to a custom emoticons object store 310.

When a user writes a real-time text message, a custom emoticon's character sequence, such as @FDAN, can be inserted along with the other text of the message. A device and/or an application, such as an exemplary CEE 206, in response to receiving a text message including the character sequence @FDAN can map to the custom emoticon associated with @FDAN and insert the custom emoticon in place of @FDAN.

Exemplary Methods

Figure 7:
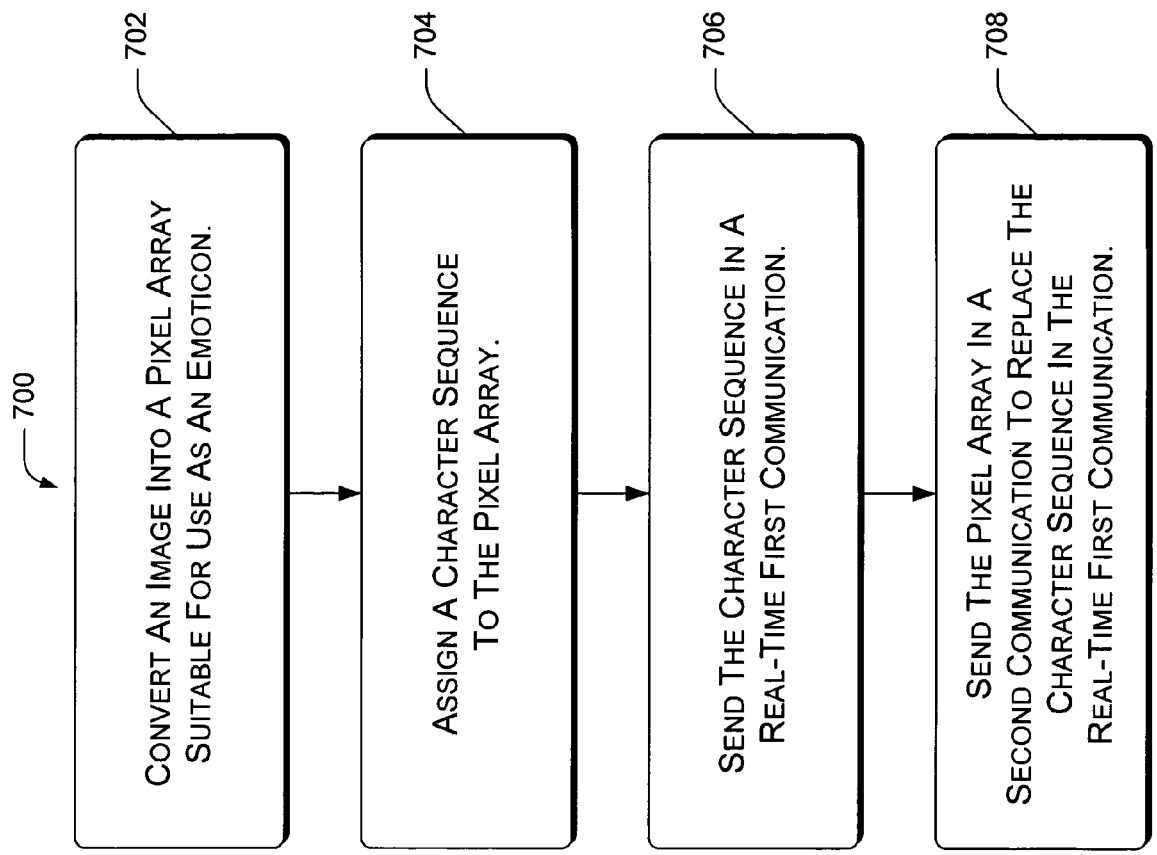
FIG. 7 is a flow diagram of an exemplary method of creating and sending custom emoticons.

FIG. 7 shows an exemplary method 700 of sending a custom emoticon in a real-time communication without adding graphics overhead to a text part of the communication. In the flow diagram, operations are summarized in individual blocks. The operations may be performed in hardware and/or as machine-readable instructions (software or firmware) that can be executed by a processor or engine, such as an exemplary CEE 206.

At block 702, an image is converted into a pixel array suitable for use as an emoticon, for example by an image selector 308 that includes a pixel array generator 314. Uniformity of size can be imparted to images selected to be custom emoticons by representing each custom emoticon by the same size pixel grid.

At block 704, a character sequence is assigned to the pixel array, for example, by a character sequence assignor 316 of an exemplary CEE 206 soliciting the characters of the sequence from a user. The character sequence can typically be entered in the same manner as the text of a real-time communication that contains the character sequence and not only marks the place in the communication where an associated custom emoticon should be inserted but also becomes a pointer for retrieving the custom emoticon from a sender or local cache.

At block 706, the character sequence is sent within a real-time communication. A text message being used for the real-time communication may have one or more of the character sequences entered with the rest of the text of the message. In one implementation, each character sequence is also turned into an object name that can be parsed into a location identity of an associated custom emoticon and/or into a hash that can be used as an address for finding the custom emoticon locally.

At block 708, the pixel array is sent by an exemplary CEE 206 in a second communication that is separate from the first communication to replace the character sequence in the real-time first communication with a custom emoticon.

FIG. 8 shows an exemplary method 800 of receiving a real-time communication and retrieving a custom emoticon to replace a character sequence embedded in the real-time communication. In the flow diagram, operations are summarized in individual blocks. The operations may be performed in hardware and/or as machine-readable instructions (software or firmware) that can be executed by a processor or engine, such as an exemplary CEE 206.

At block 802, online real-time communication is received, e.g., by a message receiver 318 of an exemplary CEE 206, that includes a character sequence mappable to a pixel array, that is, a custom emoticon, residing outside of or external to the communication. In other words, the real-time communication is devoid of custom emoticons as emoticon graphics occupy too much data space for the real-time communication.

At block 804, the pixel array (i.e., the custom emoticon) is retrieved using the character sequence, for example, using an emoticon retriever 406 of an exemplary CEE 206. Directly or indirectly, the character sequence points to a local or remote location of the custom emoticon. In one implementation, the character sequence is parsed on the sender's side into an object name, which is then stored in a header of a real-time message. The object name has a first aspect that can be used to determine whether the custom emoticon being retrieved already exists in a local cache on the receiver's side. The object name also has a second aspect that can be used to retrieve the custom emoticon from an IP address of the sender, if necessary.

In one implementation an application or device practicing the exemplary method 800 attempts to find the custom emoticon on a local cache on the receiver's side, then if the custom emoticon is not available locally tries to establish a P2P connection with the sender, and if this fails, then tries to obtain the custom emoticon through the control of an intervening server.

At block 806, the character sequence mappable to the custom emoticon is replaced in the received real-time communication with the retrieved custom emoticon, for example, by a substitution module 408 of an exemplary CEE 206. In one implementation, the position for inserting and/or substituting the custom emoticon in a real-time message may have been stored in a message header by the sender. In one implementation, a blank placeholder graphic is displayed if the retrieval of a custom emoticon is delayed, while in another implementation the character sequence associated with a custom emoticon is displayed if the retrieval of a custom emoticon is delayed.

Exemplary Computing Device

FIG. 9 shows an exemplary computing device 900 suitable as an environment for practicing aspects of the subject matter, for example as a client 202, 204 for online real-time communication. The components of computing device 900 may include, but are not limited to, a processing unit 920, a system memory 930, and a system bus 921 that couples various system components including the system memory 930 to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computing device 900 typically includes a variety of computing device-readable media. Computing device-readable media can be any available media that can be accessed by computing device 900 and includes both volatile and nonvolatile media, removable and non-removable media. By way of example, and not limitation, computing device-readable media may comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Communication media typically embodies computing device-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 930 includes computing device storage media in the form of volatile and/or nonvolatile memory such as read only memory (ROM) 931 and random access memory (RAM) 932. A basic input/output system 933 (BIOS), containing the basic routines that help to transfer information between elements within computing device 900, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937. Although the exemplary CEE 206 is depicted as software in random access memory 932, other implementations of an exemplary CEE 206 can be hardware or combinations of software and hardware.

The exemplary computing device 900 may also include other removable/non-removable, volatile/nonvolatile computing device storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface such as interface 950.

The drives and their associated computing device storage media discussed above and illustrated in FIG. 9 provide storage of computing device-readable instructions, data structures, program modules, and other data for computing device 900. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the exemplary computing device 900 through input devices such as a keyboard 948 and pointing device 961, commonly referred to as a mouse, trackball, or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port, or a universal serial bus (USB). A monitor 962 or other type of display device is also connected to the system bus 921 via an interface, such as a video interface 990. In addition to the monitor 962, computing devices may also include other peripheral output devices such as speakers 997 and printer 996, which may be connected through an output peripheral interface 995.

The exemplary computing device 900 may operate in a networked environment using logical connections to one or more remote computing devices, such as a remote computing device 980. The remote computing device 980 may be a personal computing device, a server, a router, a network PC, a peer device or other common network node, and typically includes many or all of the elements described above relative to computing device 900, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computing device networks, intranets, and the Internet.

When used in a LAN networking environment, the exemplary computing device 900 is connected to the LAN 971 through a network interface or adapter 970. When used in a WAN networking environment, the exemplary computing device 900 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the exemplary computing device 900, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computing devices may be used.

CONCLUSION

The subject matter described above can be implemented in hardware, in software, or in firmware, or in any combination of hardware, software, and firmware. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary custom emoticons, methods of creating and transferring emoticons, and an exemplary emoticon engine. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   selecting, by a user via a user-input device of a sender, a still image that includes a single array grid of pixels, wherein the still image is not part of an existing character set stored on the sender;
   transforming, by a pixel array generator of the sender, the selected still image into a custom graphical emoticon;
   obtaining a character sequence from the user via the user-input device of the sender, the character sequence including alphanumeric characters;
   assigning, by a processor configured with executable instructions, the character sequence to the custom graphical emoticon, the character sequence representing the custom graphical emoticon, wherein the character sequence acts as a placeholder for the custom graphical emoticon;
   obtaining a message from the user via the user-input device of the sender, the message including textual content with the emoticon-placeholding character sequence embedded therein;
   transmitting the message from the sender to a destination via a message-transmission modality of transmission, the transmitted message including the textual content with the emoticon-placeholding character sequence embedded therein; and
   separately from the transmitting of the message, sending the custom graphical emoticon to the destination via a different modality of transmission than the message-transmission modality of transmission.

2. The method as recited in claim 1, wherein the obtaining of the character sequence limits the character sequence to have characters less than or equal to seven.

3. The method as recited in claim 1, wherein the single array grid of the custom graphical emoticon comprises a pre-determined sized pixel array grid.

4. The method as recited in claim 1, wherein the message-transmission modality of transmission includes text messaging.

5. The method as recited in claim 1, further comprising parsing the character sequence into an object name for the custom graphical emoticon, wherein the object name includes a globally unique identifier of the custom graphical emoticon and a location of the custom graphical emoticon in an emoticon object store in the sender.

6. The method as recited in claim 1, further comprising:
receiving a request from the destination for the custom graphical emoticon; and
in response to the request, performing the sending of the custom graphical emoticon to the destination.

7. The method as recited in claim 1, wherein the custom graphical emoticon comprises a portable network graphics file.

8. The method as recited in claim 1, further comprising:
parsing the character sequence into an identifier and a location of the custom graphical emoticon in an emoticon object store in the sender; and
storing the identifier and the location in a header of the message that includes the textual content with the emoticon-placeholding character sequence embedded therein.

9. The method as recited in claim 8, wherein the identifier and the location comprise at least parts of an object name for the custom graphical emoticon.

10. The method as recited in claim 9, wherein the object name is stored in the header of the message.

11. The method as recited in claim 1, wherein the different modality of transmission of the sending uses at least one of an object store and an object transport mechanism.

12. The method as recited in claim 1, wherein the message-transmission modality of transmission comprises instant messaging.

13. The method as recited in claim 1, wherein the message-transmission modality of transmission is limited to the textual content only.

14. A custom emoticon engine having at least a physical component in a computing device, the custom emoticon engine comprising:
an image selector configured to create a custom graphical emoticon from a still image, wherein the custom graphical emoticon is representable as a single array grid of pixels;
a custom emoticon object store configured to store the custom graphical emoticon;
a character sequence assignor configured to associate a sequence of characters with the custom graphical emoticon, the sequence of characters being input by a user via a user-input device; and
a transmitter configured to send the character sequence embedded in a text message to a destination, wherein the array grid of pixels replaces the character sequence within the text message at the destination as both of the text message and the array grid of pixels are displayed on a screen.

15. The custom emoticon engine as recited in claim 14, further comprising a user interface wherein a first dialogue is deployed to define custom graphical emoticons and a second dialogue is deployed to create real-time messages to include character sequences associated with the custom graphical emoticons.

16. The custom emoticon engine as recited in claim 14, wherein the custom emoticon object store is further configured to transfer data of custom graphical emoticons separately from the text message that includes the character sequence.

17. The custom emoticon engine as recited in claim 14, further comprising a character sequence parser, wherein the character sequence is parsed into an object name usable as an emoticon identifier and an emoticon locator.

18. The custom emoticon engine as recited in claim 17, further comprising a header engine to store object names in a header of the text message.

19. The custom emoticon engine as recited in claim 17, wherein the custom emoticon engine uses an object store mechanism.

20. The custom emoticon engine as recited in claim 17, wherein the custom emoticon engine uses an object transport mechanism.

21. A computing device storage media containing instructions that are executable by a computer to perform actions comprising:
creating a custom graphical emoticon by selecting an image associated with the custom graphical emoticon by a sender;
representing the image as a single array grid of pixels for the custom graphical emoticon;
assigning a character sequence to the custom graphical emoticon, wherein the character sequence is assignable by the sender; and
transmitting a text message by the sender along with the character sequence to a destination to allow for reconstruction of the custom graphical emoticon at the destination, wherein the custom graphical emoticon is substituted within the text message for the character sequence within the text message, and both the text message and the custom graphical emoticon are to be received in the same dialog.

22. The computing device storage media as recited in claim 21, wherein the character sequence allows real-time mapping to the custom graphical emoticon.

23. The computing device storage media as recited in claim 21, further comprising instructions to parse the character sequence into an object name for the custom graphical emoticon, wherein the object name includes an identifier of the custom graphical emoticon and a location of the custom graphical emoticon.

24. The computing device storage media as recited in claim 21, further comprising instructions to:
transmit the character sequence in a real-time first communication; and
transmit data representing the custom graphical emoticon in a second communication, wherein the data is used to reconstruct the custom graphical emoticon in place of the character sequence in the real-time first communication.

25. The computing device storage media as recited in claim 21, further comprising instructions to:
parse the character sequence into an identifier and a location of the custom graphical emoticon; and
store the identifier and the location in a header of the message that includes the character sequence.

26. The computing device storage media as recited in claim 21, further comprising instructions to retrieve the custom graphical emoticon.

27. The computing device storage media as recited in claim 26, further comprising instructions to retrieve the custom graphical emoticon using one of an object store mechanism and an object transport mechanism.

28. A method for facilitating communication using custom emoticons, the method comprising:
- creating, by a pixel array generator, an emoticon pixel set by a sender by selecting a single set of pixels, which is a custom emoticon;
- storing the emoticon pixel set in a custom emoticon object store of the sender;
- transferring the emoticon pixel set to a destination from the custom emoticon object store of the sender, wherein the transferring comprises establishing a real-time peer-to-peer link between the sender and the destination to retrieve the emoticon pixel set from the custom emoticon object store of the sender;
- sending instructions to the destination on how to retrieve the emoticon pixel set;
- mapping the character sequence to the emoticon pixel set using a keyboard device;
- parsing the character sequence into an object name for the pixel emoticon set, wherein the object name includes both an identifier and a location of the pixel emoticon set;
- storing the identifier and the location in a header of a text message; and
- transmitting, to the destination, the text message by a sender, the text message including the character sequence, which was mapped to the pixel emoticon set, the destination being configured to identify and locate the transferred emoticon pixel set at the destination using the identifier and the location transmitted in the header of the text message, wherein both the text message and the emoticon pixel set are displayed on a screen of the destination, the emoticon pixel set being substituted at the destination within the text message for the character sequence mapped to the emoticon pixel set within the text message, the emoticon pixel set being transferred from the sender to the destination separately from the transmission of the text message from the sender to the destination.

29. A method for facilitating communication using custom emoticons, the method comprising:
- receiving a communication by a message receiver, wherein the communication comprises:
  - a text message, the text message including a custom-emoticon-mapped character sequence, which is mapped to a custom emoticon pixel set, which is defined as a set of pixels residing outside the communication; and
  - a header storing at least one of an identifier and a location of the custom emoticon pixel set, the identifier and the location comprising at least part of an object name for the custom emoticon pixel set;
- determining whether the custom emoticon pixel set is stored in a local storage medium of the message receiver, wherein the determining utilizes the identifier and the location;
- in response to the determining, retrieving the custom emoticon pixel set from the local storage medium of the message receiver;
- otherwise, retrieving the custom emoticon pixel set from a storage medium associated with the sender of the communication or with a server, in which the communication did not originate; and
- displaying the text message in a screen, the custom emoticon pixel set being displayed in the text message instead of and in place of the custom-emoticon-mapped character sequence in the text message.

* * * * *